US012770870B2

(12) United States Patent
Suematsu et al.

(10) Patent No.: US 12,770,870 B2
(45) Date of Patent: Oct. 20, 2026

(54) NEGATIVE ELECTRODE ACTIVE MATERIAL AND ALL SOLID BATTERY

(71) Applicant: TAIYO YUDEN CO., LTD., Tokyo (JP)

(72) Inventors: Taiki Suematsu, Tokyo (JP); Daigo Ito, Tokyo (JP); Katsunori Yokoshima, Tokyo (JP); Hiroto Mori, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 629 days.

(21) Appl. No.: 18/262,898

(22) PCT Filed: Jan. 12, 2022

(86) PCT No.: PCT/JP2022/000702
§ 371 (c)(1),
(2) Date: Jan. 24, 2024

(87) PCT Pub. No.: WO2022/185717
PCT Pub. Date: Sep. 9, 2022

(65) Prior Publication Data

US 2025/0192166 A1 Jun. 12, 2025

(30) Foreign Application Priority Data

Mar. 4, 2021 (JP) ................................ 2021-034362

(51) Int. Cl.
*H01M 4/485* (2010.01)
*C01G 35/00* (2006.01)
(Continued)

(52) U.S. Cl.
CPC .......... *H01M 4/485* (2013.01); *C01G 35/006* (2013.01); *H01M 10/0585* (2013.01);
(Continued)

(58) Field of Classification Search
None
See application file for complete search history.

(56) References Cited

U.S. PATENT DOCUMENTS

2005/0147889 A1 7/2005 Ohzuku et al. ............ 429/231.1
2015/0086872 A1* 3/2015 Ise .................... C01G 49/0018
427/122
(Continued)

FOREIGN PATENT DOCUMENTS

JP 4554911 B2 7/2010
JP 4707950 B2 3/2011
(Continued)

OTHER PUBLICATIONS

International Search Report dated Mar. 16, 2021 issued in PCT Application No. PCT/JP2022/000702.
(Continued)

*Primary Examiner* — Kevin M Bernatz
(74) *Attorney, Agent, or Firm* — Stein IP, LLC

(57) ABSTRACT

A negative electrode active material, characterized in that a composition formula of the negative electrode active material is $TiTa_{2-x}M_xO_7$, $0.2 \le x \le 1.0$, and M includes at least Nb.

5 Claims, 11 Drawing Sheets

(51) Int. Cl.
*H01M 4/02* (2006.01)
*H01M 10/0585* (2010.01)

(52) U.S. Cl.
CPC ...... *C01P 2002/50* (2013.01); *C01P 2004/61* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 2015/0270542 | A1* | 9/2015 | Harada | H01M 50/211 252/519.12 |
| 2016/0079588 | A1* | 3/2016 | Harada | H01M 4/485 429/61 |
| 2016/0276650 | A1 | 9/2016 | Hoshina et al. | |
| 2017/0141390 | A1* | 5/2017 | Harada | H01M 50/211 |
| 2020/0067079 | A1 | 2/2020 | Pan et al. | |
| 2020/0118769 | A1* | 4/2020 | Ma | C01B 19/002 |
| 2020/0295361 | A1* | 9/2020 | Takami | H01M 4/366 |
| 2025/0201832 | A1* | 6/2025 | Suematsu | H01M 50/434 |

FOREIGN PATENT DOCUMENTS

| | | | |
|---|---|---|---|
| JP | 2015-084321 | A | 4/2015 |
| JP | 2016-062700 | A | 4/2016 |
| JP | 2016-177900 | | 10/2016 |
| WO | WO 2014/038311 | A1 | 3/2014 |
| WO | WO 2015/140934 | A1 | 9/2015 |

OTHER PUBLICATIONS

Written Opinion of the International Searching Authority dated Mar. 16, 2021 issued in PCT Application No. PCT/ JP2022/000702.

Written Opinion of International Searching Authority mailed Sep. 14, 2023, issued to PCT Application No. PCT/JP2022/000702.

* cited by examiner

NEGATIVE ELECTRODE ACTIVE MATERIAL AND ALL SOLID BATTERY

CROSS-REFERENCE TO RELATED APPLICATIONS

This application is a national stage of International Application No. PCT/JP2022/000702, filed Jan. 12, 2022, which claims the benefit of Japanese Application No. 2021-034362, filed Mar. 4, 2021, in the Japanese Patent Office, the disclosures of which are incorporated herein by reference.

TECHNICAL FIELD

The present invention relates to a negative electrode active material and an all solid battery.

BACKGROUND ART

In recent years, all solid batteries have been used as secondary batteries with high energy density. Electrode active materials for use in all solid batteries have been developed (see Patent Documents 1 and 2, for example).

PRIOR ART DOCUMENT

Patent Document

Patent Document 1: International Publication No. 2014/038311

Patent Document 2: Japanese Patent No. 4707950

DISCLOSURE OF THE INVENTION

Problems to be Solved by the Invention

In recent years, secondary batteries have been used in various fields. A secondary battery using an electrolytic solution has problems such as leakage of the electrolytic solution. Therefore, development of an all solid battery in which a solid electrolyte is provided and other components are also solid is being developed. A solid electrolyte has a wider potential window (stability over a wide range of potentials) than an electrolytic solution. In particular, oxide-based solid electrolytes, which exhibit high ion conductivity by sintering, have advantages such as a wider potential window and relative stability in the atmosphere, compared to electrolytic solution systems and other solid electrolyte systems.

In addition to basic battery characteristics such as coulombic efficiency, cycle characteristics, and capacity, the characteristics required for electrode active materials applied to all solid batteries using oxide-based solid electrolytes are that mutual diffusion reactions when co-sintered with the solid electrolyte are unlikely to occur, and volumetric changes due to charging and discharging are small. Furthermore, in the case of a negative electrode active material, the charge/discharge operation should occur at a sufficiently low operating potential.

Also, in order to drive a device such as an IC (Integrated Circuit), it is required to control the cell voltage so that it does not drop below 1.8V, for example. Therefore, in many batteries, an end-point voltage (lower limit voltage) is set, and measures are taken such as charging when the monitored cell voltage drops to the end-point voltage. The discharge curve of a general battery changes to a steeper slope with respect to the slope of the voltage drop in the potential plateau at the end of the discharge when the remaining battery power is low. A voltage drop in a short period of time is one of the factors that make it difficult to detect the end point.

The present invention has been made in view of the above problems, and has a purpose of providing an oxide-based negative electrode active material which is not a carbon-based negative electrode or a silicon-based negative electrode and is suitable for an all solid battery which has a large volume change due to charging and discharging, and providing an all solid battery which has high coulombic efficiency, good cycle characteristics, high capacity, does not easily react with the electrolyte material during heat treatment, has a linear discharge curve that makes it easy to grasp the remaining battery capacity, and has a shape that makes it easy to detect the end-point voltage, and providing an all solid battery using the negative electrode active material.

Means for Solving the Problems

A negative electrode active material, characterized in that: a composition formula of the negative electrode active material is $TiTa_{2-x}M_xO_7$, $0.2 \leq x \leq 1.0$, and M includes at least Nb.

In the above-mentioned negative electrode active material, a minimum value of an absolute value |dV/dSOC| which is a slope of a discharge curve in a range of 90% to 10% of remaining battery capacity, when a discharge capacity when discharging until 3.0 V vs. $Li/Li^+$ after charging to 1.0V vs. $Li/Li^+$ is 100%, may be 3.5 [mV/%] or more; and a difference between a maximum value of |dV/dSOC| and the minimum value may be less than 8.5 [mV/%].

In the above-mentioned negative electrode active material, the $TiTa_{2-x}M_xO_7$ may be $TiTa_{1.5}Nb_{0.5}O_7$.

An all solid battery of the present invention includes: an oxide-based solid electrolyte layer; a first electrode layer that is provided on a first main face of the oxide-based solid electrolyte layer and includes a positive electrode active material; and a second electrode layer that is provided on a second main face of the oxide-based solid electrolyte layer and includes a negative electrode active material.

In the above-mentioned all solid battery an average grain diameter of the negative electrode active material in the second electrode layer may be 1 μm or more and 10 μm or less.

Effects of the Invention

According to this invention, the negative electrode active material and the all solid battery which can facilitate the detection of a battery remaining amount and the detection of an end-point voltage can be provided.

BEST MODES FOR CARRYING OUT THE INVENTION

A description will be given of an embodiment with reference to the accompanying drawings.

Figure 1:
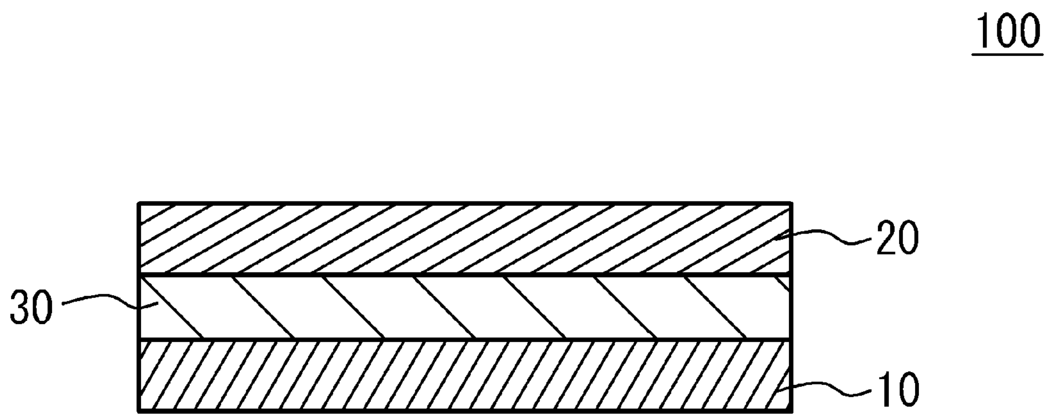
FIG. 1 is a schematic cross-sectional view illustrating a basic structure of an all solid battery.

(Embodiment) FIG. 1 illustrates a schematic cross section of a basic structure of an all solid battery 100. As illustrated in FIG. 1, the all solid battery 100 has a structure in which a first internal electrode 10 (a first electrode layer) and a second internal electrode 20 (a second electrode layer) sandwich a solid electrolyte layer 30. The first internal electrode 10 is provided on a first main face of the solid electrolyte layer 30. The second internal electrode 20 is provided on a second main face of the solid electrolyte layer 30.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is a solid electrolyte having ion conductivity. The solid electrolyte of the solid electrolyte layer 30 is oxide-based solid electrolyte having lithium ion conductivity. The solid electrolyte is phosphoric acid salt-based solid electrolyte having NASICON crystal structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like.

The first internal electrode 10 used as a positive electrode includes a material having an olivine type crystal structure, as an electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The second internal electrode 20 may include a negative electrode active material.

In the making of the first internal electrode 10 and the second internal electrode 20, in addition to these electrode active materials, a solid electrolyte having ion conductivity, a conductive material (conductive aid), and the like are added. For these members, an internal electrode paste can be obtained by uniformly dispersing a binder and a plasticizer in water or an organic solvent. A carbon material or the like may be contained as a conductive aid. A metal may be contained as a conductive aid. Examples of the metal of the conductive aid include Pd, Ni, Cu, Fe, alloys containing these, and the like. The solid electrolyte contained in the first internal electrode 10 and the second internal electrode 20 can be the same as the main component solid electrolyte of the solid electrolyte layer 30, for example.

Here, the voltage change during cell charging and discharging of the all solid battery will be explained. The all solid battery has the characteristic that the cell voltage decreases as the discharge progresses and the remaining battery power decreases. In order to drive a device such as an IC chip, it is required to control the cell voltage of an all solid battery so that it does not drop below a predetermined voltage (for example, 1.8V). Therefore, in many batteries, an end-point voltage (lower limit voltage) is set, and measures are taken such as charging when the monitored cell voltage drops to the end-point voltage. Therefore, it is desirable to be able to easily detect the endpoint voltage.

Figure 2:
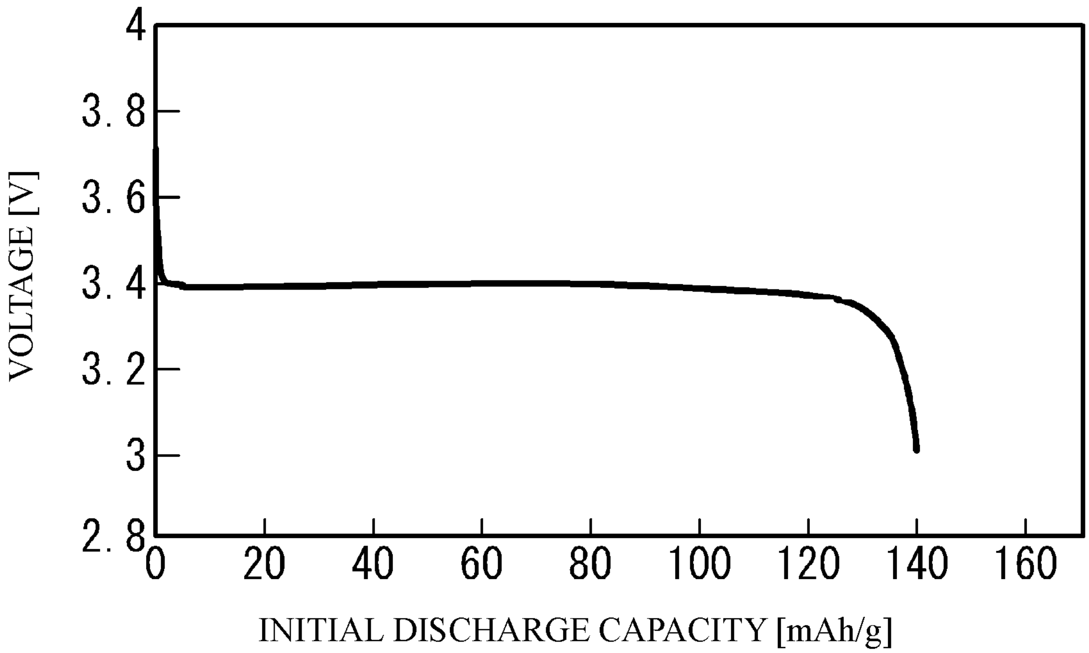
FIG. 2 illustrates a discharge curve of a positive electrode active material having an olivine type crystal structure.

However, the discharge curve of a general all solid battery has a potential plateau (also called a plateau) based on the oxidation-reduction potential specific to the positive and negative electrodes, so it is difficult to analogize the remaining battery capacity during the discharge process. In addition, at the end of discharge when the remaining battery capacity is low, the slope changes steeper than the slope of the voltage drop in the potential plateau. For example, as illustrated in FIG. 2, the positive electrode active material having the above-described olivine-type crystal structure causes a sudden drop in voltage when discharging is performed from a state in which charging is completed. After that, a substantially constant (or hardly lowered) potential plateau appears even if the discharge progresses. The voltage drops sharply along with the discharge from the end of the potential plateau. Therefore, the voltage may drop significantly below the end-point voltage during the period from the detection of the end-point voltage to the start of charging. In FIG. 2, the horizontal axis indicates the amount of discharge, and the vertical axis indicates the cell voltage.

Therefore, in this embodiment, a $TiTa_2O_7$-based oxide having a monoclinic structure is used as the negative electrode active material. Note that $TiTa_2O_7$, in which Ta is not substituted with another metal element, has a low negative electrode operating potential, a small volume change accompanying charge and discharge, exhibits good cycle characteristics, and has a low weight specific capacity, but a high volume specific capacity. Therefore, $TiTa_2O_7$ is suitable for a small all solid battery in which the weight of the battery is not so important. However, $TiTa_2O_7$ is not easy to detect the end point voltage in the charge/discharge curve.

In the embodiment, $TiTa_{2-x}M_xO_7$ ($0.2 \le x \le 1.0$, M contains at least Nb, and may contain a pentavalent metal element), in which part of Ta is substituted with another metal element, is used as the negative electrode active material. Generally, Nb generally undergoes a two-electron reaction ($Nb^{5+} \rightarrow Nb^{4+} \rightarrow Nb^{3+}$) more easily than Ta. Therefore, When Ta in $TiTa_2O_7$ is replaced with Nb, it is thought that (3+x) of electron reaction occurs per 1 mol of $TiTa_{2-x}M_xO_7$. Therefore, the larger the value x is, the larger the capacity is. On the other hand, it is considered that the higher the number of reaction electrons is, the greater the volume change associated with Li insertion/desorption is, and the more likely deterioration of cycle characteristics occurs.

Figure 3:
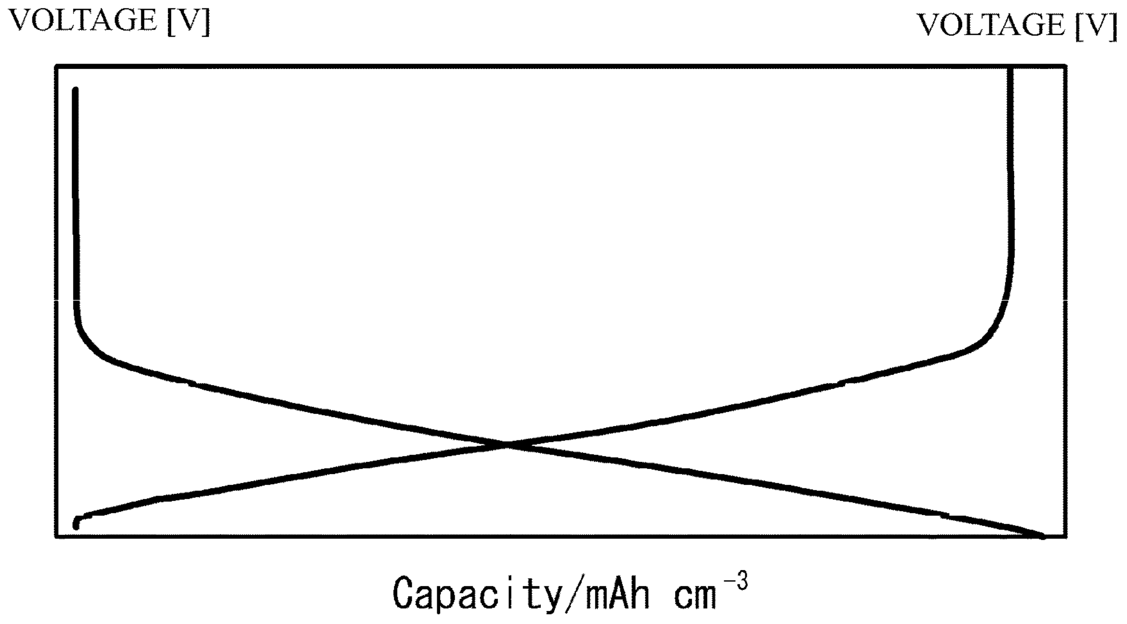
FIG. 3 illustrates a charge/discharge curve of a negative electrode active material of an embodiment.

In $TiTa_{2-x}M_xO_7$, as illustrated in FIG. 3, the negative electrode potential is not maintained at a constant value with respect to the amount of discharge, and gradually increases with a slope that is not abrupt. As a result, it becomes easy to grasp the remaining battery level at any stage of discharge, and the end point voltage can also be easily detected.

In $TiTa_{2-x}M_xO_7$, if the value of x is too small, there is a risk that the actual capacity will decrease and the detectability of the remaining battery level will decrease. Therefore, x is preferably 0.2 or more. For example, x is more preferably 0.5 or more in terms of actual capacity. In addition, x is preferably 0.2 or more, more preferably 0.3 or more, in terms of detectability of the remaining battery level.

If the value of x is too large, the coulomb efficiency and cycle characteristics may deteriorate, the detectability of the remaining battery level and end point voltage may deteriorate, and deterioration may occur due to reaction with the solid electrolyte during heat treatment. Therefore, x is preferably 1.0 or less. For example, x is preferably 1.0 or less, more preferably 0.7 or less, in terms of battery characteristics such as coulombic efficiency and cycle characteristics. In terms of remaining battery level detectability and end point voltage detectability, x is preferably 1.0 or less, more preferably 0.7 or less. Furthermore, in terms of reactivity during heat treatment with the solid electrolyte, x is preferably 1.0 or less, more preferably 0.5 or less.

All of M may be Nb. For example, it is preferable to use $TiTa_{1.5}Nb_{0.5}O_7$ as the negative electrode active material.

As a negative electrode characteristic, an absolute value |dV/dSOC| which is the slope of a discharge curve (that is, the ratio of the voltage change to the remaining battery charge change) in the range of 90% to 10% of remaining battery capacity (in the embodiment, defined as SOC) is focused on, when discharging (releasing Li) until 3.0 V vs. $Li/Li^+$ after charging (inserting Li) to 1.0V vs. $Li/Li^+$ is 100%. The higher this value is, the smaller the ratio of the potential plateau that lowers the detection accuracy of the remaining battery level, and the more preferably it is always 3.5 [mV/%] or more within the above range. Further, the smaller the difference between the maximum value and the minimum value of |dV/dSOC| is, the more linear the discharge curve becomes, and the easier it is to detect the remaining battery level and the end point voltage. The difference is preferably 8.5 [mV/%] or less, more preferably 7.5 [mV/%] or less, and even more preferably 6.5 [mV/%] or less. When |dV/dSOC| is within the above preferable range, the battery can be discharged with a constant voltage change, and the remaining battery level can be grasped with high accuracy, so that the battery can be easily used.

If the average grain diameter of the negative electrode active material in the second internal electrode 20 is too large, the internal resistance of the electrode increases, making high-speed charging and discharging difficult, which is not preferable. If the average grain diameter is too small, the reactivity during heat treatment increases, and the linearity of the charge-discharge curve (remaining battery level detectability) decreases due to the decrease in composition uniformity in the negative electrode active material grainss, which is not preferable. The average grain diameter of the negative electrode active material in the second internal electrode 20 is preferably 1 μm or more and 10 μm or less, more preferably 1.5 μm or more and 8 μm or less, and even more preferably 2 μm or more and 6 μm or less.

In manufacturing the all solid battery 100, a multilayer capacitor type structure in which the first internal electrodes 10 and the second internal electrodes 20 are alternately stacked in parallel via the solid electrolyte layer 30 increases the capacity density and reduces the size. At that time, it is preferable that the thickness of the first internal electrode 10 and the thickness of the second internal electrode 20 are approximately the same. Therefore, it is preferable to balance the capacity by adding more positive electrode active material than the negative electrode active material, because capacity per volume of the negative electrode active material is higher than that of general positive electrode active materials. Therefore, the active material with high electronic conductivity is added to the first internal electrode 10 in a volume larger than that of the negative active material to reduce the amount of the conductive aid, or the active material with high ionic conductivity is added in a volume larger than that of the negative active material. By adding more $LiCoPO_4$, whose electronic conductivity increases after charging, than the volume of the negative electrode active material, and by making the volume of the conductive aid smaller than the volume of the negative electrode conductive aid, balance between capacity and electronic conduction can be achieved. When the first internal electrode 10 and the second internal electrode 20 have approximately the same thickness, it is necessary to make the volume ratio of the negative electrode active material smaller than that of the positive electrode active material in order to balance the capacity. Therefore, the volume ratio of the negative electrode active material in the second internal electrode 20 is 15 to 50 vol. % is preferable. When the thickness of the first internal electrode 10 and the thickness of the second internal electrode 20 are approximately equal to each other, the thickness of one of the first internal electrodes 10 and the thickness of the second internal electrodes 20 is within +20% of the other.

Figure 4:
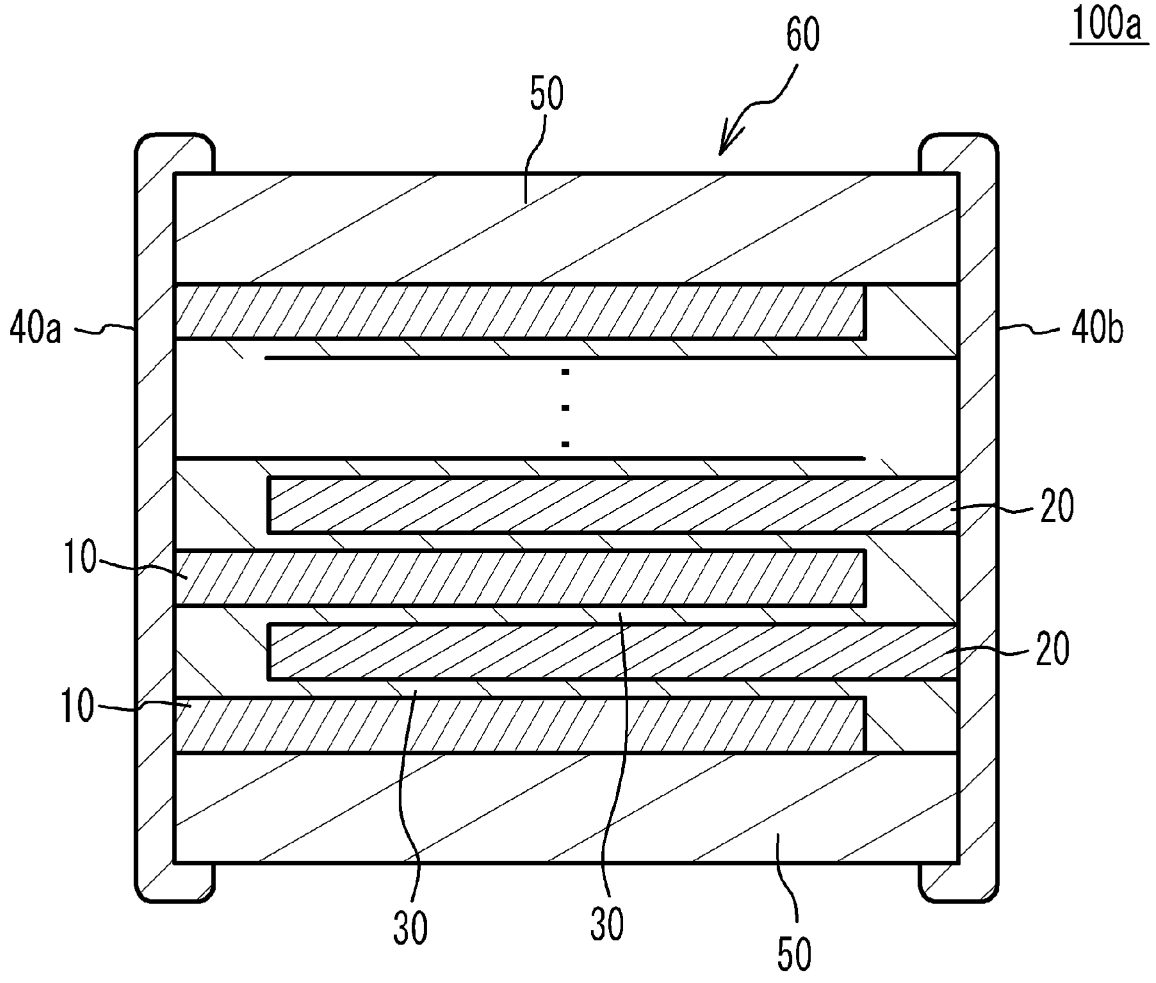
FIG. 4 illustrates a schematic cross section of a stack-type all solid battery.

FIG. 4 illustrates a schematic cross section of an all solid battery 100*a* in which a plurality of cell units are stacked. The all solid battery 100*a* has a multilayer chip 60 having a rectangular parallelepiped shape. Each of a first external electrode 40*a* and a second external electrode 40*b* is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40*a* and the second external electrode 40*b* are provided so as to contact two side faces facing each other (hereinafter referred to as two edge faces).

In the following description, the same numeral is added to each member that has the same composition range, the same thickness range and the same particle distribution range as that of the all solid battery 100. And, a detail explanation of the same member is omitted.

In the all solid battery 100*a*, each of the first internal electrodes 10 and each of the second internal electrodes 20 sandwich each of the solid electrolyte layer 30 and are alternately stacked. Edges of the first internal electrodes 10 are exposed to the first edge face of the multilayer chip 60 but are not exposed to the second edge face of the multilayer chip 60. Edges of the second internal electrodes 20 are exposed to the second edge face of the multilayer chip 60 but are not exposed to the first edge face. Thus, each of the first internal electrodes 10 and each of the second internal electrodes 20 are alternately conducted to the first external electrode 40*a* and the second external electrode 40*b*. The solid electrolyte layer 30 extends from the first external electrode 40*a* to the second external electrode 40*b*. In this way, the all solid battery 100*a* has a structure in which a plurality of cell units are stacked.

A cover layer 50 is stacked on an upper face (in FIG. 4 on the upper face of the uppermost internal electrode) of a stacked structure of the first internal electrode 10, the solid electrolyte layer 30 and the second internal electrode 20. Another cover layer 50 is stacked on a lower face (in FIG. 4, on the lower face of the lowermost internal electrode) of the stacked structure. A main component of the cover layer 50 is an inorganic material such as Al, Zr, Ti (for example, $Al_2O_3$, $ZrO_2$, $TiO_2$ or the like). The main component of the cover layer 50 may be the main component of the solid electrolyte layer 30.

Figure 5:
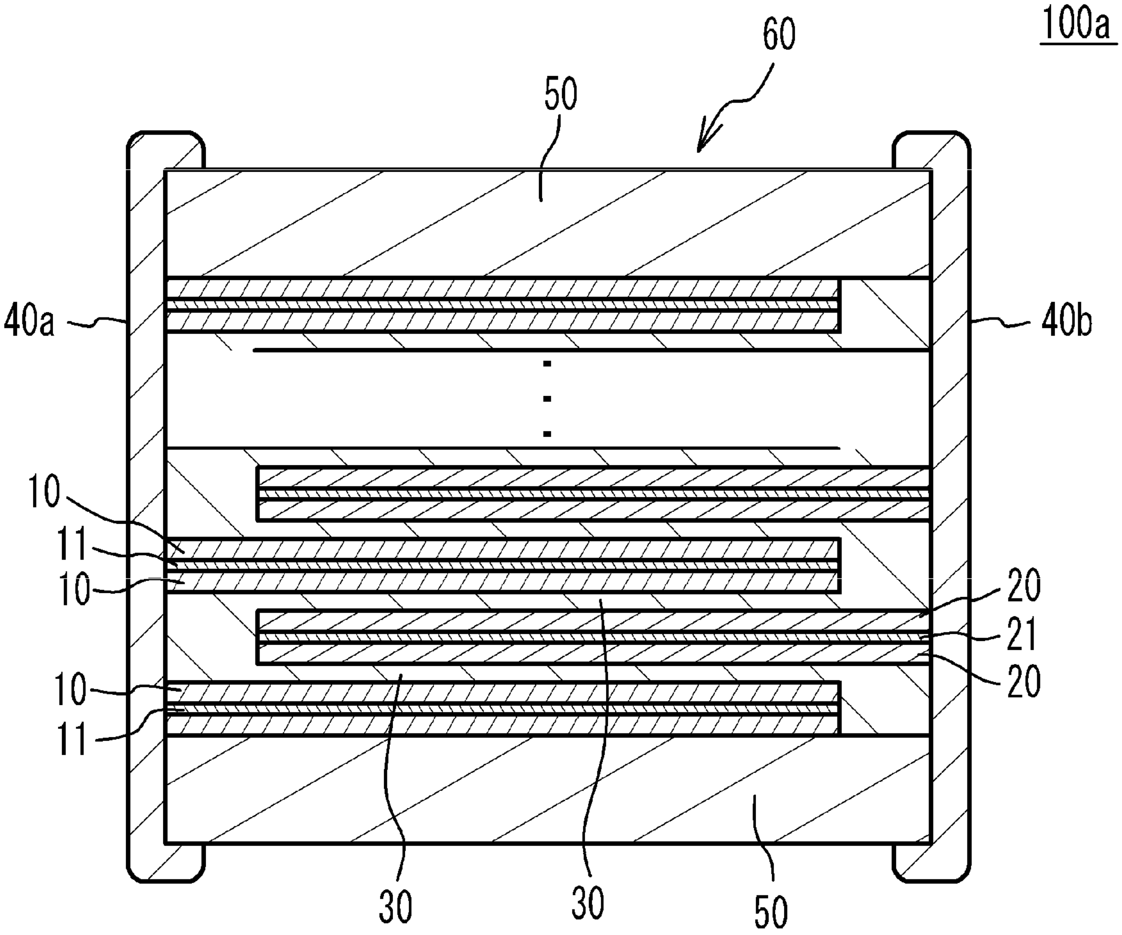
FIG. 5 illustrates another example of a stack-type all solid battery.

The first internal electrode 10 and the second internal electrode 20 may have an electric collector layer. For example, as illustrated in FIG. 5 a first electric collector layer 11 may be provided in the first internal electrode 10. A second electric collector layer 21 may be provided in the second internal electrode 20. A main component of the first electric collector layer 11 and the second electric collector layer 21 is a conductive material. For example, the conductive material of the first electric collector layer 11 and the second electric collector layer 21 may be such as a metal, carbon or the like. When the first electric collector layer 11 is connected to the first external electrode 40*a* and the second electric collector layer 21 is connected to the second external electrode 40*b*, current collecting efficiency is improved.

Figure 6:
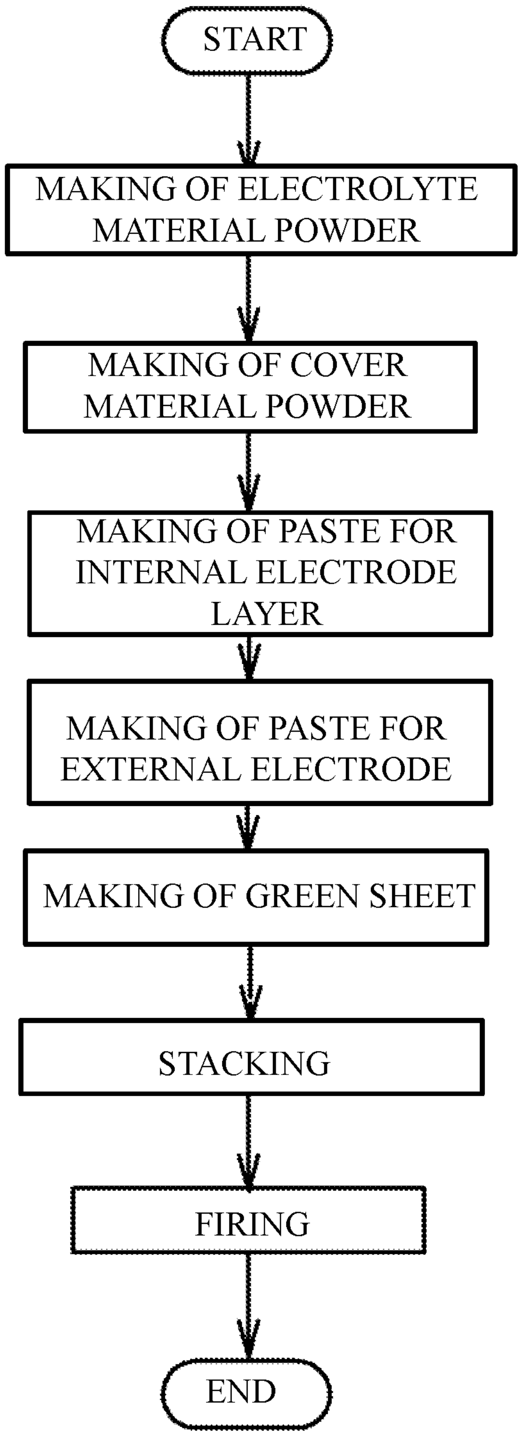
FIG. 6 illustrates a flowchart of a manufacturing method of an all solid battery; and FIG. 7A

A description will be given of a manufacturing method of the all solid battery 100*a* illustrated in FIG. 4. FIG. 6 illustrates a flowchart of the manufacturing method of the all solid battery 100*a*.

(Making process of negative electrode active material powder) $TiO_2$, $Ta_2O_5$, and $Nb_2O_5$, which are the raw materials of $TiTa_{2-x}Nb_xO_7$, are weighed so as to have a molar ratio of 2:(2-x):x, and are ground and mixed. After mixing, the mixture is calcined at 1100° C. in the air, and the obtained calcined powder is subjected to a crushing treatment again. After that, the target $TiTa_{2-x}Nb_xO_7$ synthetic powder is obtained by heat-treating in the air at 1300° C. After the synthetic powder is crushed again, the powder is sieved through a #150 stainless steel mesh to obtain a negative electrode active material powder.

In $TiTa_{2-x}M_xO_7$, the $TiO_6$ octahedron, $TaO_6$ octahedron, and $MO_6$ octahedron are randomly arranged in the crystal structure. It is considered that the more uniform these are, the less likely a plateau of the oxidation-reduction potential occurs compared to a single metal oxide. Therefore, it is considered that the higher the synthesis temperature is, the more stable the charge/discharge curve tends to be. If the sintering temperature during synthesis is too high, the particles tend to adhere to each other, making it difficult to handle. Therefore, it is not preferable that the sintering temperature during synthesis is too high. If the sintering temperature during synthesis is too low, the uniformity of each of metal atoms is degraded. Therefore, it is not preferable that the sintering temperature during synthesis is too low. The firing temperature is preferably 1150° C. or higher and 1450° C. or lower, more preferably 1200° C. or higher and 1400° C. or lower, even more preferably 1250° C. or higher and 1350° C. or lower.

(Making process of raw material powder for solid electrolyte layer) First, raw material powder for the solid electrolyte layer that constitutes the solid electrolyte layer 30 described above is prepared. For example, raw material powder for the solid electrolyte layer can be produced by mixing raw materials, additives, and the like and using a solid-phase synthesis method or the like. By dry pulverizing the obtained raw material powder, it is possible to adjust to a desired average particle size. For example, a planetary ball mill using $ZrO_2$ balls of 5 mmϕ is used to adjust the desired average particle size.

(Making process of raw material powder for cover layer) First, a ceramic raw material powder that constitutes the cover layer 50 described above is prepared. For example, raw material powder for the cover layer can be made by mixing raw materials, additives and so on and using a solid-phase synthesis method or the like. By dry pulverizing the obtained raw material powder, it is possible to adjust to a desired average particle size. For example, a planetary ball mill using $ZrO_2$ balls of 5 mmϕ is used to adjust the desired average particle size.

(Making process for internal electrode paste) Next, an internal electrode paste for forming the above-described first internal electrode 10 and the second internal electrode 20 is made. For example, an internal electrode paste can be obtained by uniformly dispersing a conductive aid, an electrode active material, a solid electrolyte material, a sintering aid, a binder, a plasticizer, and so on in water or an organic solvent. As the solid electrolyte material, the solid electrolyte paste described above may be used. A carbon material or the like is used as the conductive aid. A metal may be used as the conductive aid. Examples of the metal of the conductive aid include Pd, Ni, Cu, Fe, or alloys containing these Pd, Ni, Cu, Fe. Pd, Ni, Cu, Fe, or alloys containing these Pd, Ni, Cu, Fe or various carbon materials may also be used. When the compositions of the first internal electrode 10 and the second internal electrode 20 are different from each other, the respective internal electrode pastes may be prepared separately.

As the sintering aid, for example, any glass component such as Li—B—O based compounds, Li—Si—O based compounds, Li—C—O based compounds, Li—S—O based compounds, and Li—P—O based compounds can be used.

(Making process for external electrode paste) Next, an external electrode paste for forming the first external electrode 40*a* and the second external electrode 40*b* is made. For example, an external electrode paste can be obtained by uniformly dispersing a conductive material, a glass frit, a binder, a plasticizer, and the like in water or an organic solvent.

(Forming process of green sheet) A solid electrolyte slurry having a desired average particle size is prepared by uniformly dispersing the raw material powder for the solid electrolyte layer in an aqueous solvent or an organic solvent together with a binder, a dispersant, a plasticizer, and so on followed by wet pulverization. At this time, a bead mill, a wet jet mill, various kneaders, a high-pressure homogenizer, or the like can be used. And it is preferable to use a bead mill from the viewpoint of being able to simultaneously adjust the particle size distribution and disperse. A binder is added to the obtained solid electrolyte slurry to obtain a solid electrolyte paste. By applying the obtained solid electrolyte paste, the solid electrolyte green sheet 51 can be formed. The applying method is not particularly limited. A slot die method, a reverse coating method, a gravure coating method, a bar coating method, a doctor blade method, or the like can be used. The particle size distribution after wet pulverization can be measured, for example, using a laser diffraction measurement device using a laser diffraction scattering method.

Figure 7A:
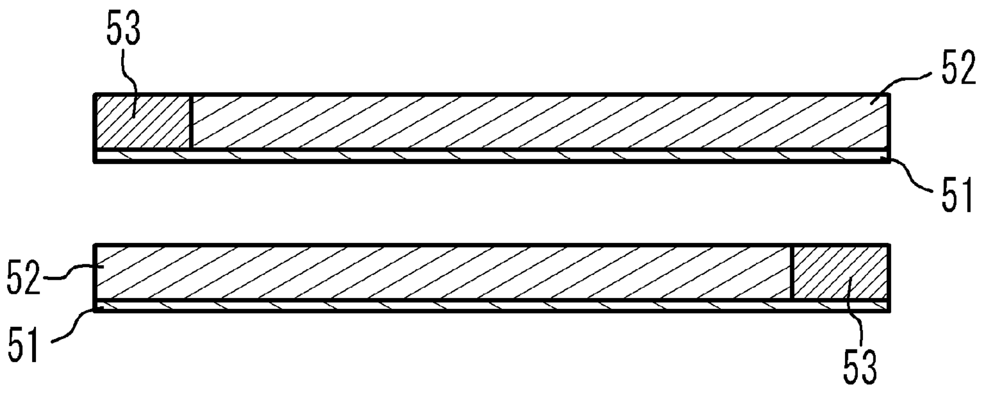
FIG. 7B illustrates a stacking process.
Figure 7B:
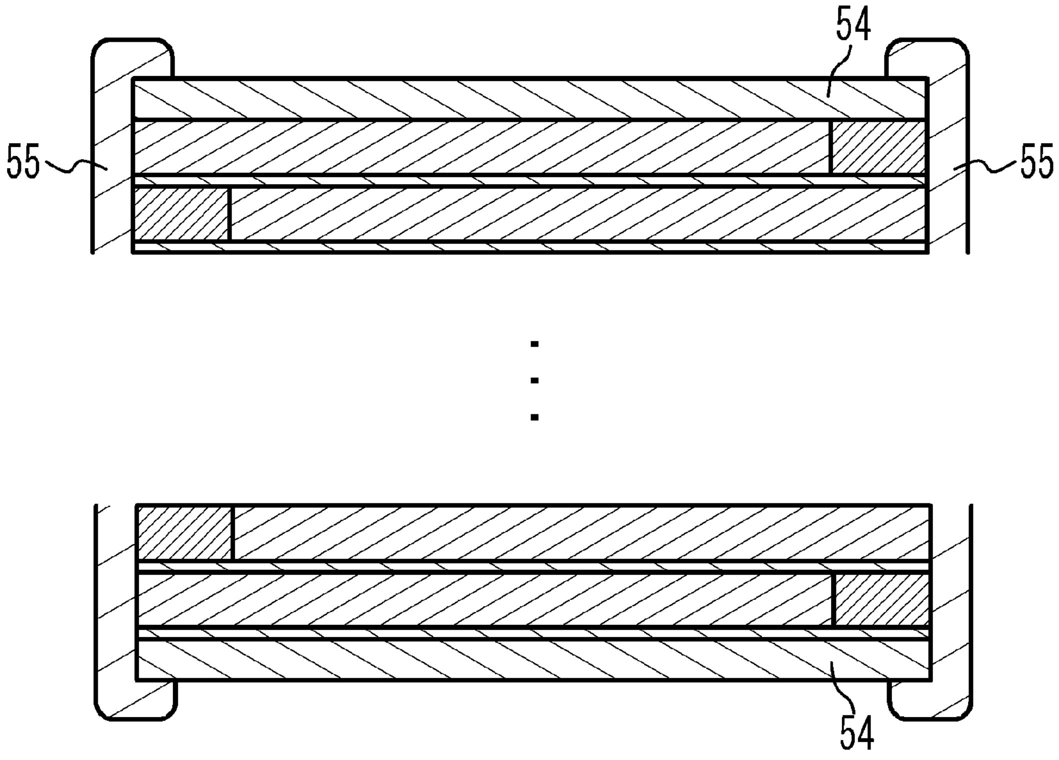

(Stacking process) Paste 52 for internal electrode is printed on one face of the solid electrolyte green sheet 51, as illustrated in FIG. 7A. A reverse pattern 53 is printed on a part of the solid electrolyte green sheet 51 where the paste 52 for electrode layer is not printed. A material of the reverse pattern 53 may be the same as that of the solid electrolyte green sheet 51. The solid electrolyte green sheets 51 after printing are stacked so that each of the solid electrolyte green sheets 51 is alternately shifted to each other. As illustrated in FIG. 7B, cover sheets 54 are crimped from an upper side and a lower side of the stacking direction. Thus, a multilayer structure is obtained. In this case, in the multilayer structure, each of the paste 52 for internal electrode is alternately exposed to the two end faces. The cover sheet 54 is formed by printing the material powder for cover layer with the same method as the forming of the solid electrolyte green sheet. The cover sheet 54 may be thickened during printing of the cover sheet 54. The cover sheet 54 may be thickened by stacking t plurality of the printed sheets.

Next, the two end faces are coated with paste 55 for external electrode by dipping method or the like. After that, the paste 55 for external electrode is dried. Thus, a compact for forming the all solid battery 100*a* is obtained.

(Firing process) Next, the obtained multilayer structure is fired. The firing conditions are oxidizing atmosphere or non-oxidizing atmosphere, and the maximum temperature is preferably 400° C. to 1000° C., more preferably 500° C. to 900° C., without any particular limitation. A step of holding below the maximum temperature in an oxidizing atmosphere may be provided to sufficiently remove the binder until the maximum temperature is reached. In order to reduce process costs, it is desirable to perform the firing at as low a temperature as possible. After firing, re-oxidation process may be performed. Through the above steps, the all solid battery 100*a* is produced.

The internal electrode paste, a current collector paste containing the conductive material, and the internal electrode paste may be sequentially stacked to form current collector layers in the first internal electrode 10 and the second internal electrode 20.

EXAMPLES

All solid batteries were produced according to the embodiments, and their characteristics were investigated.

(Example 1) The raw materials $TiO_2$, $Ta_2O_5$, and $Nb_2O_5$ were weighed at a molar ratio of 2:1.8:0.2 and mixed by grinding so that the composition ratio was $TiTa_{1.8}Nb_{0.2}O_7$. After mixing, the mixture was calcined at 1100° C. in air, and the obtained calcined powder was crushed again and heat-treated at 1300° C. in air to obtain the desired $TiTa_{1.8}Nb_{0.2}O_7$ synthetic powder. After the synthetic powder was crushed again, the powder was sieved through a #150 stainless steel mesh to obtain a negative electrode active material powder. The same diffraction peak as $TiTa_2O_7$ was observed from the XRD measurement, and no other secondary phase peaks were observed.

A coating slurry consisting of negative electrode active material powder, PVdF binder, acetylene black, and NMP was prepared, a coating film was formed on a copper foil, and a negative electrode half cell with a metallic lithium foil placed on the counter electrode was sealed in a 2032 coin cell. A charge/discharge test was performed in the range of 3 to 1 V at a charge/discharge rate of 0.1 C at 25° C.

The initial discharge capacity was 801 mAh/cm$^3$. The discharge capacity after 20 cycles was 96.6% of the initial charge capacity. When the slope of the curve |dV/dSOC| was calculated in the range of 1.05 V to 1.70 V in the discharge (Li desorption) curve, the minimum value in the entire range was 3.8 [mV/%]. It was confirmed that the non-flatness was high, and the difference between the maximum value and the minimum value was 7.6 [mV/%], indicating that the linearity was relatively high. When this negative electrode active material was mixed with the solid electrolyte LAGP at a volume ratio of 50:50 and heat-treated in air, no secondary phase was observed up to 730° C.

(Example 2) A negative electrode active material powder was prepared in the same manner as in Example 1, except that the raw materials $TiO_2$, $Ta_2O_5$, and $Nb_2O_5$ were weighed at a molar ratio of 2:1.7:0.3 so as to obtain a composition ratio of $TiTa_{1.7}Nb_{0.3}O_7$. The negative electrode active material powder was evaluated.

The initial discharge capacity was 833 mAh/cm$^3$. The capacity retention rate was 96.3%. The minimum value of |dV/dSOC| was 4.2 [mV/%], indicating high non-flatness, and the difference between the maximum and minimum values being 6.7 [mV/%], indicating high linearity. No secondary phase was observed up to 730° C. in the mixed heat treatment with the solid electrolyte.

(Example 3) A negative electrode active material powder was prepared in the same manner as in Example 1, except that the raw materials $TiO_2$, $Ta_2O_5$, and $Nb_2O_5$ were weighed at a molar ratio of 2:1.5:0.5 so as to obtain a composition ratio of $TiTa_{1.5}Nb_{0.5}O_7$. The negative electrode active material powder was evaluated.

The initial discharge capacity was 863 mAh/cm$^3$. The capacity retention rate was 94.9%. The minimum value of |dV/dSOC| was 5.7 [mV/%], indicating high non-flatness, and the difference between the maximum and minimum values being 5.2 [mV/%], indicating extremely high linearity. In the mixed heat treatment with the solid electrolyte, no secondary phase was observed up to 710° C.

(Example 4) A negative electrode active material powder was prepared in the same manner as in Example 1, except that the raw materials $TiO_2$, $Ta_2O_5$, and $Nb_2O_5$ were weighed at a molar ratio of 2:1.3:0.7 so as to obtain a composition ratio of $TiTa_{1.3}Nb_{0.7}O_7$. The negative electrode active material powder was evaluated.

The initial discharge capacity was 924 mAh/cm$^3$. The capacity retention rate was 94.4%. The minimum value of |dV/dSOC| was 5.5 [mV/%], indicating high non-flatness, and the difference between the maximum and minimum values being 6.2 [mV/%], indicating extremely high linearity. No secondary phase was observed up to 690° C. in the mixed heat treatment with the solid electrolyte.

(Example 5) A negative electrode active material powder was prepared in the same manner as in Example 1, except that the raw materials $TiO_2$, $Ta_2O_5$, and $Nb_2O_5$ were weighed at a molar ratio of 2:1:1 so as to obtain a composition ratio of $TiTaNbO_7$. The negative electrode active material powder was evaluated.

The initial discharge capacity was 894 mAh/cm$^3$. The capacity retention rate was 93.2%. The minimum value of |dV/dSOC| was 5.4 [mV/%], indicating high non-flatness, and the difference between the maximum and minimum values being 7.9 [mV/%], indicating relatively high linearity. No secondary phase was observed up to 680° C. in the mixed heat treatment with the solid electrolyte.

(Comparative example 1) A negative electrode active material powder was prepared in the same manner as in Example 1, except that the raw materials $TiO_2$ and $Ta_2O_5$ were weighed at a molar ratio of 2:1 so as to obtain a composition ratio of $TiTa_2O_7$. The negative electrode active material powder was evaluated.

The initial discharge capacity was 721 mAh/cm$^3$. The capacity retention rate was 98.6%. The minimum value of |dV/dSOC| was 0.6 [mV/%], indicating low non-flatness, and the difference between the maximum and minimum values being 20.2 [mV/%], indicating extremely low linearity. No secondary phase was observed up to 730° C. in the mixed heat treatment with the solid electrolyte.

(Comparative example 2) A negative electrode active material powder was prepared in the same manner as in Example 1, except that the raw materials $TiO_2$, $Ta_2O_5$, and $Nb_2O_5$ were weighed at a molar ratio of 2:1.85:0.15 so as to obtain a composition ratio of $TiTa_{1.85}Nb_{0.15}O_7$. The negative electrode active material powder was evaluated.

The initial discharge capacity was 754 mAh/cm$^3$. The capacity retention rate was 97.2%. The minimum value of |dV/dSOC| was 3.0 [mV/%], indicating low non-flatness, and the difference between the maximum and minimum values being 8.7 [mV/%], indicating low linearity. No secondary phase was observed up to 730° C. in the mixed heat treatment with the solid electrolyte.

(Comparative example 3) A negative electrode active material was prepared in the same manner as in Example 1, except that the raw materials $TiO_2$, $Ta_2O_5$, and $Nb_2O_5$ were weighed at a molar ratio of 2:0.9:1.1 so as to obtain a composition ratio of $TiTa_{0.9}Nb_{1.1}O_7$. The negative electrode active material powder was evaluated.

The initial discharge capacity was 930 mAh/cm$^3$. The capacity retention rate was 91.8%. The minimum value of |dV/dSOC| was 5.1 [mV/%], indicating high non-flatness, and the difference between the maximum and minimum values being 8.6 [mV/%], indicating low linearity. In the mixed heat treatment with the solid electrolyte, no secondary phase was observed up to 670° C.

(Comparative example 4) A negative electrode active material powder was prepared in the same manner as in Example 1, except that the raw materials $TiO_2$ and $Nb_2O_5$ were weighed at a molar ratio of 2:1 so that the composition ratio of $TiNb_2O_7$ was obtained. The negative electrode active material powder was evaluated.

The initial discharge capacity was 1069 mAh/cm$^3$. The capacity retention rate was 90.3%. The minimum value of |dV/dSOC| was 0.9 [mV/%], indicating low non-flatness, and the difference between the maximum and minimum values being 16.4 [mV/%], indicating extremely low linearity. No secondary phase was observed up to 650° C. in the mixed heat treatment with the solid electrolyte.

Figure 8:
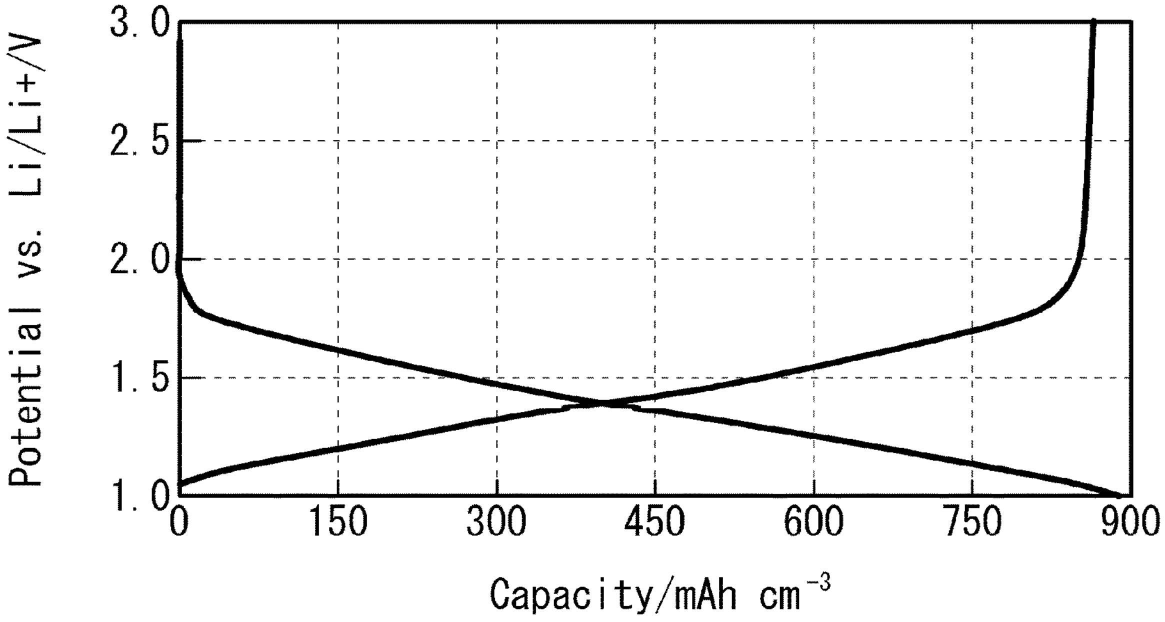
FIG. 8 illustrates a charge/discharge curve of Example 3.
Figure 9A:
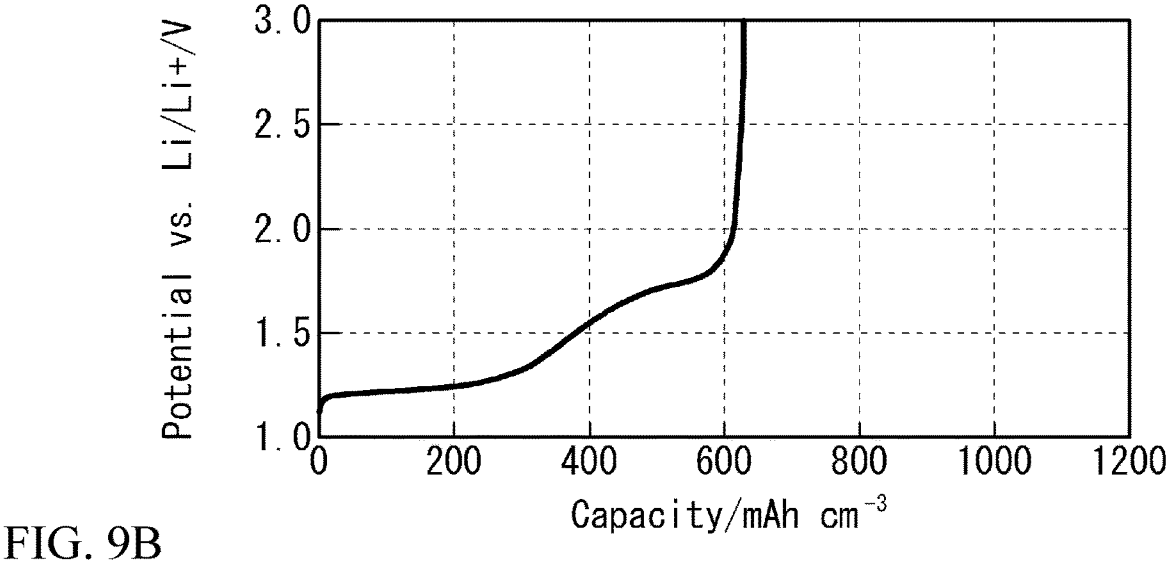
FIG. 9A shows a discharge curve of Comparative Example 1.
Figure 9B:
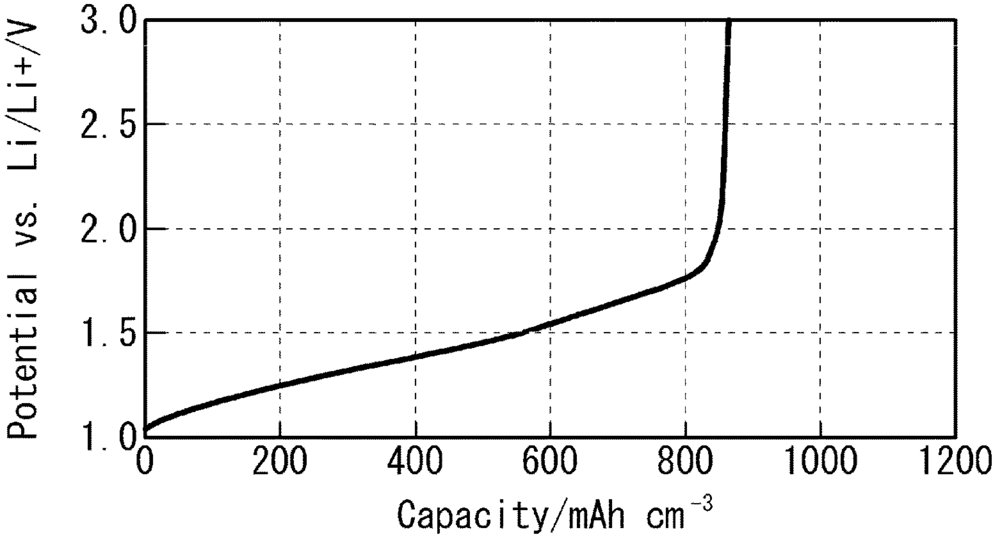
FIG. 9B shows a discharge curve of Example 3.
Figure 9C:
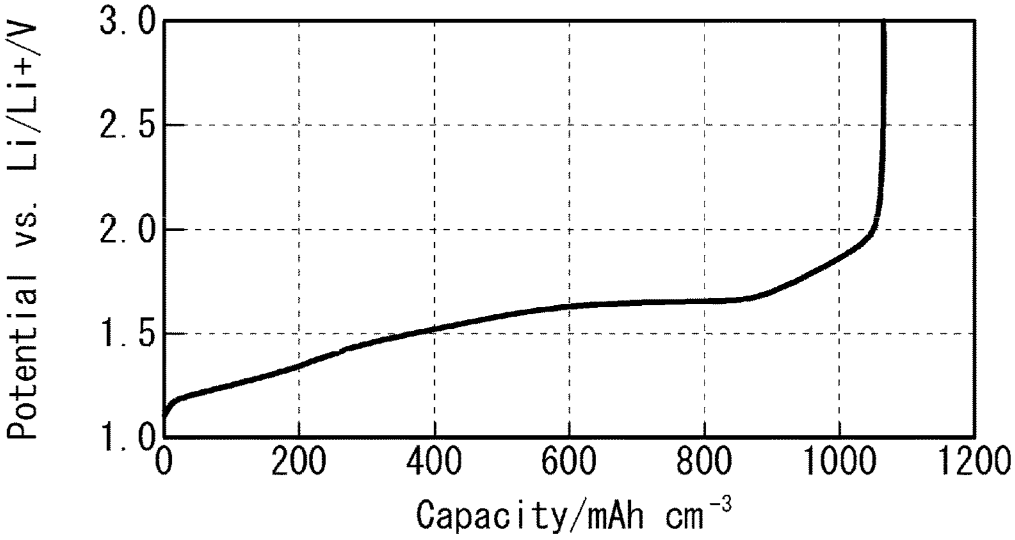
FIG. 9C shows a discharge curve of Comparative Example 4.
Figure 10A:
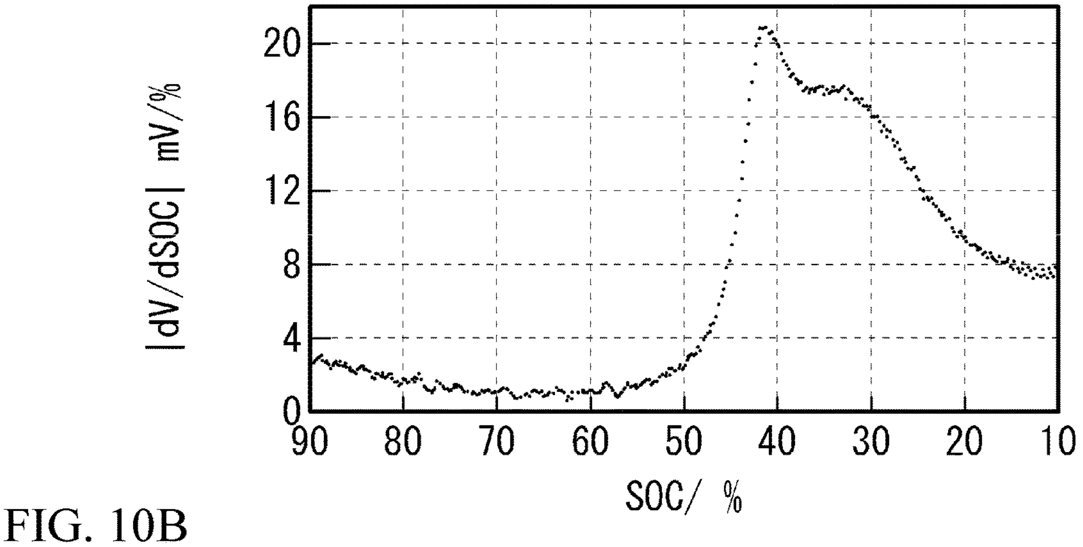
FIG. 10A is a plot of |dV/dSOC| in a range of SOC 90% to 10% in Comparative Example 1.
Figure 10B:
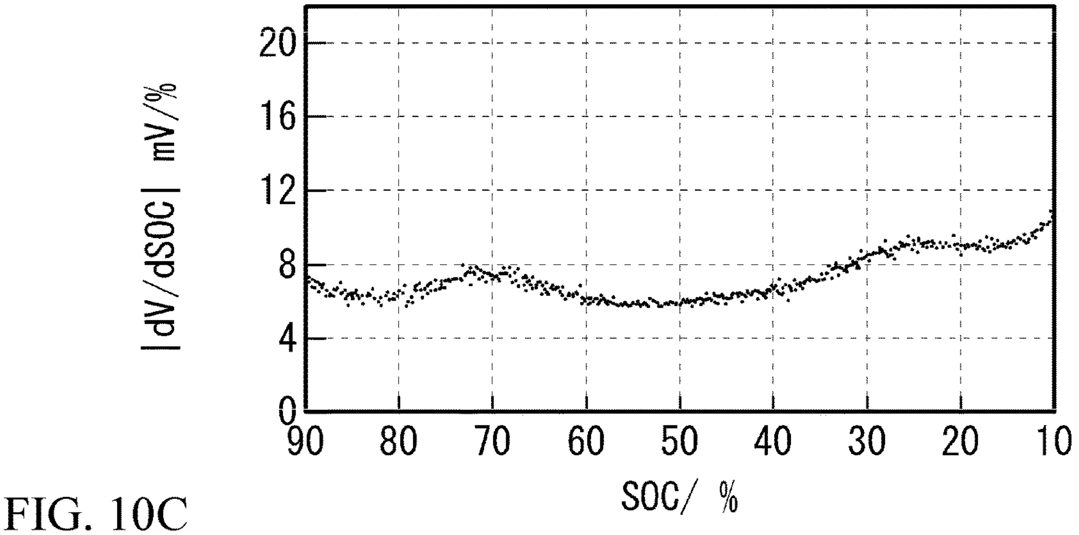
FIG. 10B is a plot of |dV/dSOC| in a range of SOC 90% to 10% in Example 3.
Figure 10C:
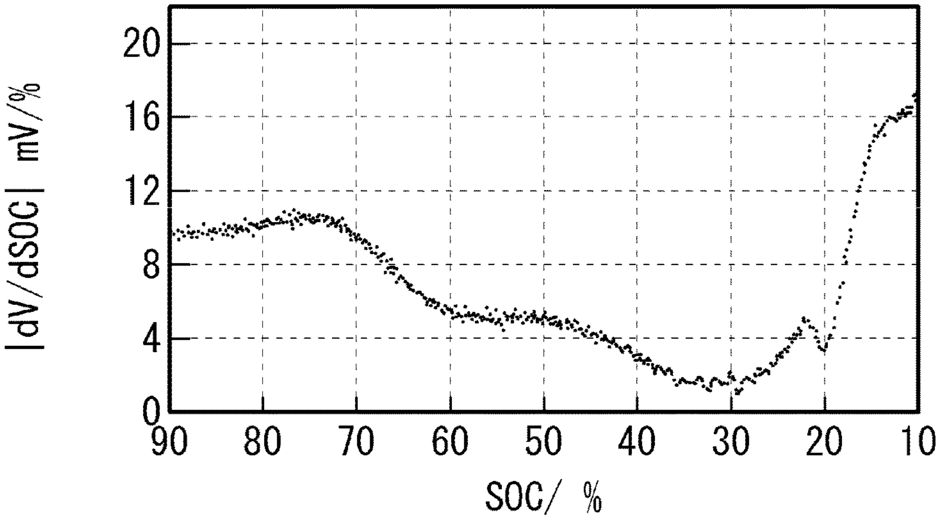
FIG. 10C is a plot of |dV/dSOC| in a range of SOC 90% to 10% in Comparative Example 4.
Figure 11A:
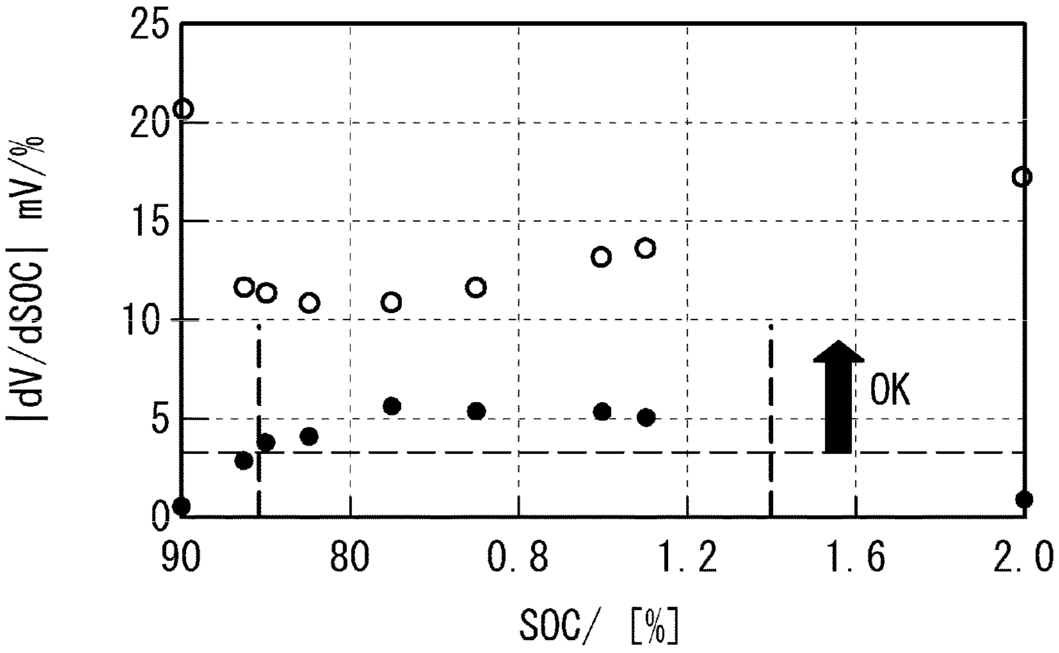
FIG. 11A is a plot diagram of maximum and minimum values of |dV/dSOC| with respect to x in Examples 1-5 and Comparative Examples 1-4.
Figure 11B:
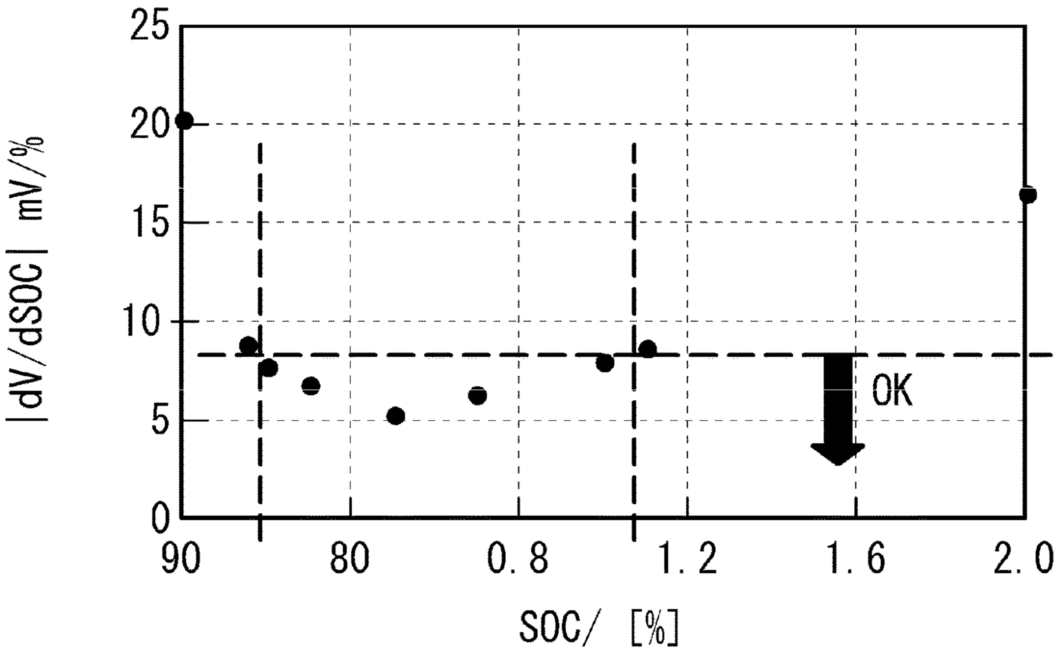
FIG. 11B is a plot diagram of a difference between maximum and minimum values of |dV/dSOC| with respect to x in Examples 1-5 and Comparative Examples 1-4.

FIG. 8 shows the charge-discharge curve of Example 3. FIG. 9A shows the discharge curve of Comparative Example 1. FIG. 9B shows the discharge curve of Example 3. FIG. 9C shows the discharge curve of Comparative Example 4. FIG. 10A is a plot of |dV/dSOC| in the range of SOC 90% to 10% in Comparative Example 1. FIG. 10B is a plot of |dV/dSOC| in the range of SOC 90% to 10% in Example 3. FIG. 10C is a plot of |dV/dSOC| in the range of SOC 90% to 10% in Comparative Example 4. FIG. 11A is a plot diagram of the maximum and minimum values of |dV/dSOC| with respect to x in Examples 1-5 and Comparative Examples 1-4. FIG. 11B is a plot diagram of the difference between the maximum and minimum values of |dV/dSOC| with respect to x in Examples 1-5 and Comparative Examples 1-4.

The results of Examples 1-5 and Comparative Examples 1~4 are summarized in Table 1. If the initial discharge capacity was 550 to 700 mAh/cm$^3$, it was judged that the sample could not be used (x). If the initial discharge capacity was 700 to 850 mAh/cm$^3$, it was judged that the sample could be used (4). If the initial discharge capacity was 850 to 1000 mAh/cm$^3$, it was judged that the sample was good (o). If the initial discharge capacity was 1000 mAh/cm$^3$ or more, it was judged that the sample was excellent (double circle). Cycle characteristics was a ratio of discharge capacity after 20 cycles when the initial charge capacity was 100% (that is, the criterion considering the initial coulombic efficiency). If the cycle characteristics was less than 90%, it was judged that the sample was extremely bad. If the cycle characteristics was 90% to 92%, it was judged that the sample could not be used (x). If the cycle characteristics was 92% to 94%, it was judged that the sample could be used (4). If the cycle characteristics was 94% to 96%, it was judged that the sample was good (o). If the cycle characteristics was 96% or more, it was judged that the sample was excellent (double circle). If the minimum value (unflatness threshold) in |dV/dSOC| of the discharge curve for determining the detectability of the remaining battery capacity and the detectability of the end point voltage was less than 3.5 [mV/%], it was judged that the sample could not be used (x). If the difference between the maximum value and the minimum value was 10 [mV/%] or more, it was judged that the sample was extremely bad (xx). If the difference was 8.5 to 10 [mV/%], it was judged that the sample could not be used (x). If the difference was 7.5 to 8.5 [mV/%], it was judged that the sample could be used (A). If the difference was 6.5 to 7.5 [mV/%], it was judged that the sample was good (o). If the difference was less than 6.5 [mV/%], it was judged that the sample was excellent (double circle). The stability during heat treatment with a solid electrolyte was determined by the maximum temperature at which the diffraction peak of the secondary phase was not generated by XRD when the powder mixed at a weight ratio of 50:50 was heat treated. If the maximum temperature was less than 660° C., it was judged that the sample could not be used (x). If the maximum temperature was 660 to 680° C., it was judged that the sample could be used (Δ). If the maximum temperature was 680 to 700° C., it was judged that the sample was good (○). If the maximum temperature was 700° C. or more, it was judged that the sample was excellent (double circle). Comprehensive judgment was made from five indices. Double circle was points. "○" was 10 points. "Δ" was 5 points. "x" was 0 points. "xx" was −10 points. The results of each item were scored. If the total score was less than 30 points, the comprehensive judgement was "xx". If the total score was 30 to 50 points, the comprehensive judgement was "x". If the total score was less than 50 to 65 points, the comprehensive judgement was "Δ". If the total score was less than 65 to 75 points, the comprehensive judgement was "○". If the total score was less than 75 points or more, the comprehensive judgement was "double circle". Table 1 shows the results.

TABLE 1

| | X | COMPOSITION RATIO | DISCHARGE CAPACITY [mAh/cm³] | | CYCLE CHARAC-TERISTIC | | MINIMUM VALUE OF \|Dv/dSOC\| | |
|---|---|---|---|---|---|---|---|---|
| COMPARATIVE EXAMPLE 1 | 0 | $TiTa_2O_7$ | 721 | Δ | 98.6 | ◎ | 0.6 | X |
| COMPARATIVE EXAMPLE 2 | 0.15 | $TiTa_{1.85}Nb_{0.15}O_7$ | 754 | Δ | 97.2 | ◎ | 3.0 | X |
| EXAMPLE 1 | 0.2 | $TiTa_{1.8}Nb_{0.2}O_7$ | 801 | Δ | 96.6 | ◎ | 3.8 | ◎ |
| EXAMPLE 2 | 0.3 | $TiTa_{1.7}Nb_{0.3}O_7$ | 833 | Δ | 96.3 | ◎ | 4.2 | ◎ |
| EXAMPLE 3 | 0.5 | $TiTa_{1.5}Nb_{0.5}O_7$ | 863 | ○ | 94.9 | ○ | 5.7 | ◎ |
| EXAMPLE 4 | 0.7 | $TiTa_{1.3}Nb_{0.7}O_7$ | 924 | ○ | 94.4 | ○ | 5.5 | ◎ |
| EXAMPLE 5 | 1.0 | $TiTaNbO_7$ | 894 | ○ | 93.2 | Δ | 5.4 | ◎ |
| COMPARATIVE EXAMPLE 3 | 1.1 | $TiTa_{0.9}Nb_{1.1}O_7$ | 930 | ○ | 91.8 | X | 5.1 | ◎ |
| COMPARATIVE EXAMPLE 4 | 2.0 | $TiNb_2O_7$ | 1069 | ◎ | 90.3 | X | 0.9 | X |

| | DIFFERENCE OF MAXIMUM AND MINIMUM OF \|dV/dSOC\| | | MAX TEMPER-ATURE WHERE SECONDARY PHASE DOES NOT OCCUR | | TOTAL SCORE | |
|---|---|---|---|---|---|---|
| COMPARATIVE EXAMPLE 1 | 20.2 | X X | 730° C. | ◎ | 35 | X |
| COMPARATIVE EXAMPLE 2 | 8.7 | X | 730° C. | ◎ | 45 | X |
| EXAMPLE 1 | 7.6 | Δ | 730° C. | ◎ | 70 | ○ |
| EXAMPLE 2 | 6.7 | ○ | 730° C. | ◎ | 75 | ◎ |
| EXAMPLE 3 | 5.2 | ◎ | 710° C. | ◎ | 80 | ◎ |
| EXAMPLE 4 | 6.2 | ◎ | 690° C. | ○ | 70 | ○ |
| EXAMPLE 5 | 7.9 | Δ | 680° C. | ○ | 50 | Δ |
| COMPARATIVE EXAMPLE 3 | 8.6 | X | 670° C. | Δ | 35 | X |
| COMPARATIVE EXAMPLE 4 | 16.4 | XX | 650° C. | X | 10 | XX |

In Examples 1 to 5, the total score was 50 points or more. This is thought to be because the negative electrode active material represented by the composition formula $TiTa_{2-x}M_xO_7$ satisfied 0.2≤x≤1.0 and M contained at least Nb.

(Example 6) Using the $TiTa_{1.5}Nb_{0.5}O_7$ made in Example 3, an all solid battery was made and evaluated according to the embodiment. When the slope |dV/dSOC| of the discharge curve was calculated over the entire range of 3.7 V to 3.0 V, it was confirmed that the minimum value was 5.2 [mV/%] and the non-flatness was high. It was confirmed that the difference between the value and the minimum value was 6.1 [mV/%], indicating relatively high linearity. From this, it was confirmed that the detectability of the remaining battery level and the detectability of the end point were high.

(Comparative example 5) Using the $TiNb_2O_7$ made in Comparative Example 4, an all solid battery was made and evaluated according to the embodiment. When the slope |dV/dSOC| of the discharge curve was calculated over the entire range of 3.7 V to 3.0 V, it was confirmed that the minimum value was 1.3 [mV/%] and the non-flatness was low. It was confirmed that the difference between the value and the minimum value was 15.8 [mV/%] and the linearity was very low. From this, it was confirmed that the detectability of the remaining battery level and the detectability of the end point were very low.

Although the embodiments of the present invention have been described in detail, it is to be understood that the various change, substitutions, and alterations could be made hereto without departing from the spirit and scope of the invention.

DESCRIPTION OF THE REFERENCE NUMERALS

10 First internal electrode
11 First electric collector layer
20 Second internal electrode
21 Second electric collector layer
30 Solid electrolyte layer
**40*a*** First external electrode
**40*b*** Second external electrode
50 Cover layer
51 Solid electrolyte green sheet
52 Pate for Internal electrode
53 Reverse pattern
54 Cover sheet
55 Paste for external electrode
60 Multilayer chip
100, **100*a*** All solid battery

The invention claimed is:

1. A negative electrode active material, wherein:
a composition formula of the negative electrode active material is $TiTa_{2-x}M_xO_7$,
0.2≤x≤1.0, and
M includes at least Nb.

2. The negative electrode active material as claimed in claim 1, wherein:
a minimum value of an absolute value |dV/dSOC| which is a slope of a discharge curve in a range of 90% to 10% of remaining battery capacity, when a discharge capacity when discharging until 3.0 V vs. $Li/Li^+$ after charging to 1.0V vs. $Li/Li^+$ is 100%, is 3.5 [mV/%] or more; and
a difference between a maximum value of |dV/dSOC| and the minimum value is less than 8.5 [mV/%].

3. The negative electrode active material as claimed in claim 1 wherein the $TITa_{2-x}M_xO_7$ is $TiTa_{1.5}Nb_{0.5}O_7$.

4. An all solid battery comprising:

an oxide-based solid electrolyte layer;

a first electrode layer that is provided on a first main face of the oxide-based solid electrolyte layer and includes a positive electrode active material; and a second electrode layer that is provided on a second main face of the oxide-based solid electrolyte layer and includes a negative electrode active material of claim 1.

5. The all solid battery as claimed in claim 4 wherein an average grain diameter of the negative electrode active material in the second electrode layer is 1 μm or more and 10 μm or less.

* * * * *